United States Patent [19]
Holmes

[11] Patent Number: 5,790,809
[45] Date of Patent: Aug. 4, 1998

[54] REGISTRY COMMUNICATIONS MIDDLEWARE

[75] Inventor: Ralph Holmes, Glenndale, Md.

[73] Assignee: MCI Corporation, Washington, D.C.

[21] Appl. No.: 560,550

[22] Filed: Nov. 17, 1995

[51] Int. Cl.$^6$ .......................... G06F 13/42; H04L 29/06
[52] U.S. Cl. .................. 395/200.58; 395/200.36; 395/200.6; 395/200.68; 370/466
[58] Field of Search .................. 395/200.12, 200.03, 395/200.09, 200.17, 200.18, 200.01, 200.02, 200.16, 200.57, 200.58, 200.33, 200.48, 200.66, 200.76, 200.6, 200.79, 200.36, 200.75, 200.68; 370/437, 466, 467, 465

[56] References Cited

U.S. PATENT DOCUMENTS

| | | | |
|---|---|---|---|
| 5,136,716 | 8/1992 | Harvey et al. | 395/200.58 |
| 5,339,434 | 8/1994 | Rusis | 395/200.18 |
| 5,425,028 | 6/1995 | Britton et al. | 395/200.16 |
| 5,485,460 | 1/1996 | Schrier et al. | 395/200.12 |
| 5,515,508 | 5/1996 | Pettus et al. | 395/200.01 |
| 5,546,584 | 8/1996 | Lundin et al. | 395/200.02 |
| 5,548,723 | 8/1996 | Pettus | 395/200.12 |
| 5,557,748 | 9/1996 | Norris | 395/200.12 |
| 5,572,724 | 11/1996 | Watanabe et al. | |

OTHER PUBLICATIONS

Comer D.E.; Internetworking with TCP/IP, vol. I: Principles, Protocols, and Architecture; USA; Prentice-Hall, Inc.; ISBN 0-13-468505-9; Chapter 10 pp. 139-157, 1991.

*Primary Examiner*—Mark H. Rinehart

[57] ABSTRACT

A computer system has a plurality of non-compatible clients and servers selectively interconnected over a network, each client capable of initiating an application in which a related compatible server is involved. Communication between the clients and servers involve a first registry process including the acceptance of application specific messages from a client, destined for a preselected server, and encapsulating them into standard registry specific messages. The routing of the messages is determined by a database that responds to a verb command, from a particular client, to provide routing data. Next, there is translation of the registry specific messages into a preselected protocol. A second registry process occurs at a distant end to restore the message, after passing through the network. The second registry accepts the translated messages and converts them from protocol format to the original application specific format for use by the preselected compatible server.

6 Claims, 7 Drawing Sheets

REGISTRY COMMUNICATIONS MIDDLEWARE

RELATED APPLICATIONS

This application relates to co-pending application Ser. No. 08/580,950 entitled "EXITS: Extended Information Transfer Services".

FIELD OF THE INVENTION

This invention relates to distributed computing networks, and more specifically to a system that provides a standardized communications layer between client/server applications and network messaging products.

BACKGROUND OF THE INVENTION

Distributed computing is the method of allocating application data processing among several computing resources. It is a rapidly growing field in the information technology industry due to the efficiencies gained by utilizing several different processors for common applications.

Distributed computing platforms are also known as client/server platforms, because each computing resource represents either a client or a server. A client resource is a consumer of application services. It executes a fundamental process of sending request messages to a server. Clients generally represent the users of a system, such as a person running an application workstation.

A server resource is a provider of application services. It executes fundamental processes of receiving request messages from, and sending reply messages to, a client. Servers generally represent the components that maintain enterprise data resources and implement business policies.

A fundamental requirement of implementing a distributed computing platform is the integration of various types of computing and network resources into a single, enterprise-wide network. There are many products, standards, and communication protocols available for doing this, and many enterprises make use of several of them. This creates a significant problem with regards to interoperability. Several different applications running on various operating systems and hardware must interface with numerous messaging and network communication protocols. Application programmers must deal with the complexities and intricacies of all of these protocols in order for their applications to work on the distributed computing platform.

In addition, programmers must provide a means for their applications to determine the optimal transport mechanisms for messages. This is needed on both client and server resources.

Clearly there is a need for a business which utilizes distributed computing resources and networks to implement a standard interface for applications which use these resources. There is currently no product on the market to do this.

BRIEF DESCRIPTION OF THE PRESENT INVENTION

The present invention, identified as Registry, is a system that resides on each application resource (both clients and servers) of the distributed computing platform.

It is a communications agent that supports a suite of communications messaging products and network protocols. It serves as a logical layer of communications between applications and the transport mechanisms of the network.

By doing this, Registry shields the application programmers from all of the underlying complexities of proprietary messaging and transport protocols.

Registry accepts application-specific messages from clients, encapsulates them into standard Registry-specific messages, and then translates them into the protocol necessary for whichever transport and messaging mechanisms that are to be used. At the other end, Registry takes the client-sent message and translates it from the transport protocol that was used to an application-specific message that is used by the server.

Accordingly, it is an advantage of Registry that it provides enterprise-wide application connectivity across a broad array of operating systems, hardware platforms, messaging products, and network protocols.

It is another advantage of Registry that it provides a single, standard interface to applications, while providing a product-specific interface to each of several different messaging and network communication products.

It is another advantage of Registry that it allows application programmers to avoid the requirement of programming low-level messaging and transport semantics into their applications; programmers may focus on business-oriented semantics. This advantage increases the flexibility and decreases the complexities of the applications.

It is another advantage of Registry that it eliminates the need for each application to have specific interfaces to the various messaging and transport protocols that are in use.

It is another advantage of Registry that it provides applications with a means of determining optimal transport mechanisms for each transaction.

It is another advantage of Registry that it enables applications to become platform and protocol independent. That is, application programmers do not need to know which operating systems, hardware platforms, and communications protocols may be used by the application clients and servers; they only need to program in a standard interface to Registry. Also, clients and servers may be ported from one platform/protocol to another without having to program corresponding changes into each application.

It is another advantage of Registry that through the use of a logical network routing directory, changes in addresses of physical resources only require updates in Registry's directory, and not on every application.

BRIEF DESCRIPTION OF THE FIGURES

The above-mentioned objects and advantages of the present invention will be more clearly understood when considered in conjunction with the accompanying drawings, in which:

FIG. 1a is a diagram showing the logical layers of client/server communications and where Registry fits in.

FIG. 3b is a continuation of the process flowchart in FIG. 3a.

DETAILED DESCRIPTION OF THE INVENTION

Figure 1:
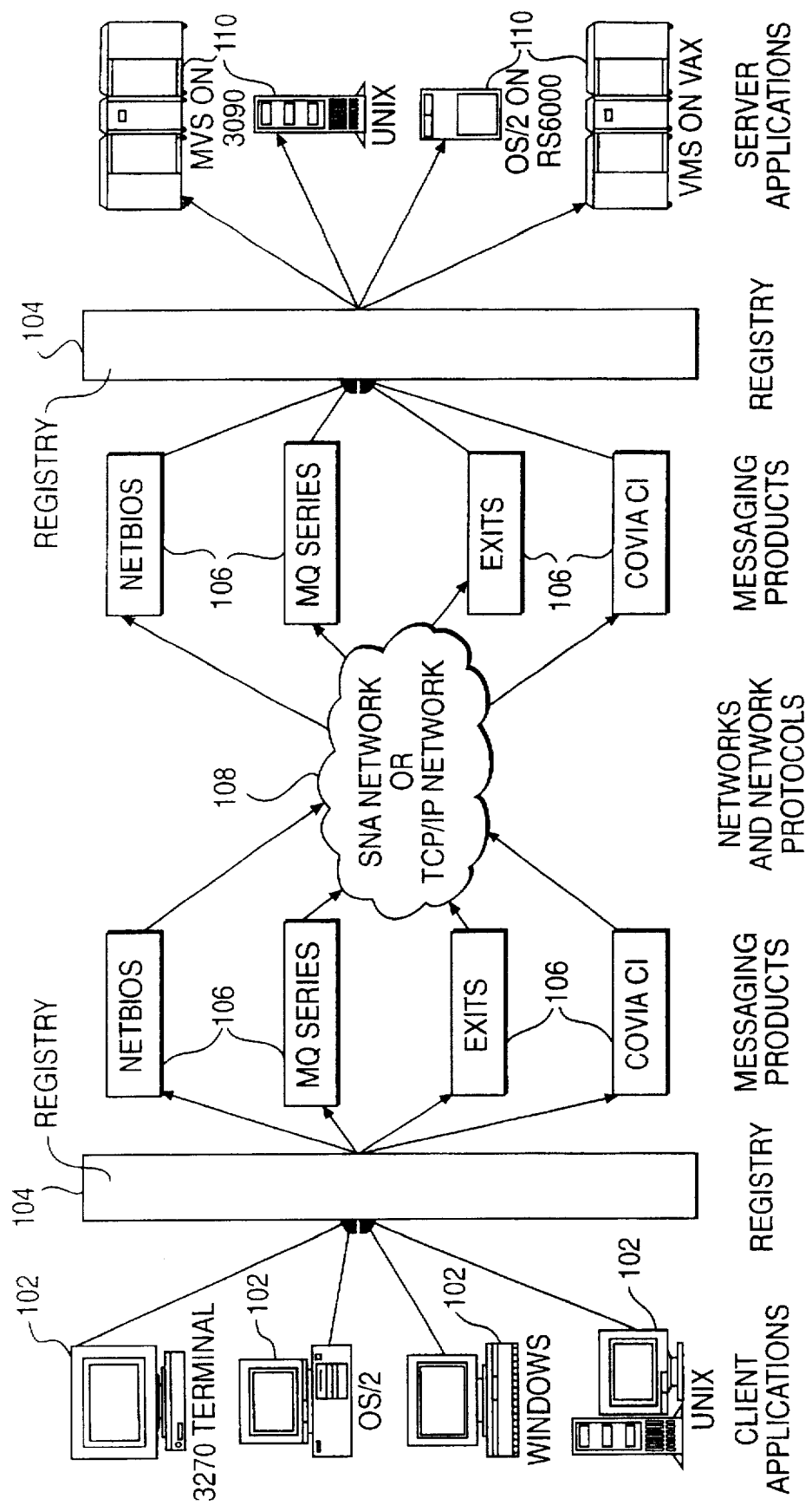
FIG. 1 is a block diagram showing a high-level systems architecture of a sample distributed computing platform utilizing Registry.

Referring to FIG. 1, Registry is depicted as a single, standard interface to both client and server applications. Registry is actually a system that resides on each individual client and server resource. It provides a single, standard interface to each client and server application to shield these applications from the complexities of various proprietary messaging products and network protocols. The operating systems, messaging products, and network protocols shown are only a sample of those supported by Registry.

Registry 104 accepts request messages from Client Applications 102 as part of a dialog. The applications 102 may run under various operation systems, as indicated. These request messages represent a solicitation for a response and/or an instruction to perform a process. They are generated by the Client Applications with the intent of being delivered to a Server Application 110. Application 110 may also be run under various operating systems, as shown. Since the Registry software resides on the same hardware components as the applications, the link between Registry 104 and the Client Applications 102 represents a software process. Although four examples of operating systems and terminal emulators are illustrated, Registry supports many more.

Registry 104 then executes a process of encapsulating the client's request message into a Registry-defined message. This process is depicted in greater detail in references to FIGS. 2 and 4. Registry determines the appropriate Messaging Product 106 and converts the message into the proprietary protocol of this Messaging Product. In some situations, Registry may actually serve as the Messaging Product; in these cases, it will convert the message to the proprietary protocol of the network transport 108 (i.e., SNA LU6.2, TCP/IP, etc.).

The Messaging Product 106 will use an appropriate network protocol for transporting the message over an available network 108. At the distant end, the Messaging Product 106 receives the message and passes it off to Registry 104. Registry converts the message from the proprietary protocol of the Messaging Product 106 to a message that is recognizable to the Server Application 110. If a response from the Server Application 110 is required, the preceding process is repeated to send the response message back to the Client Application 102.

Figure 1A:
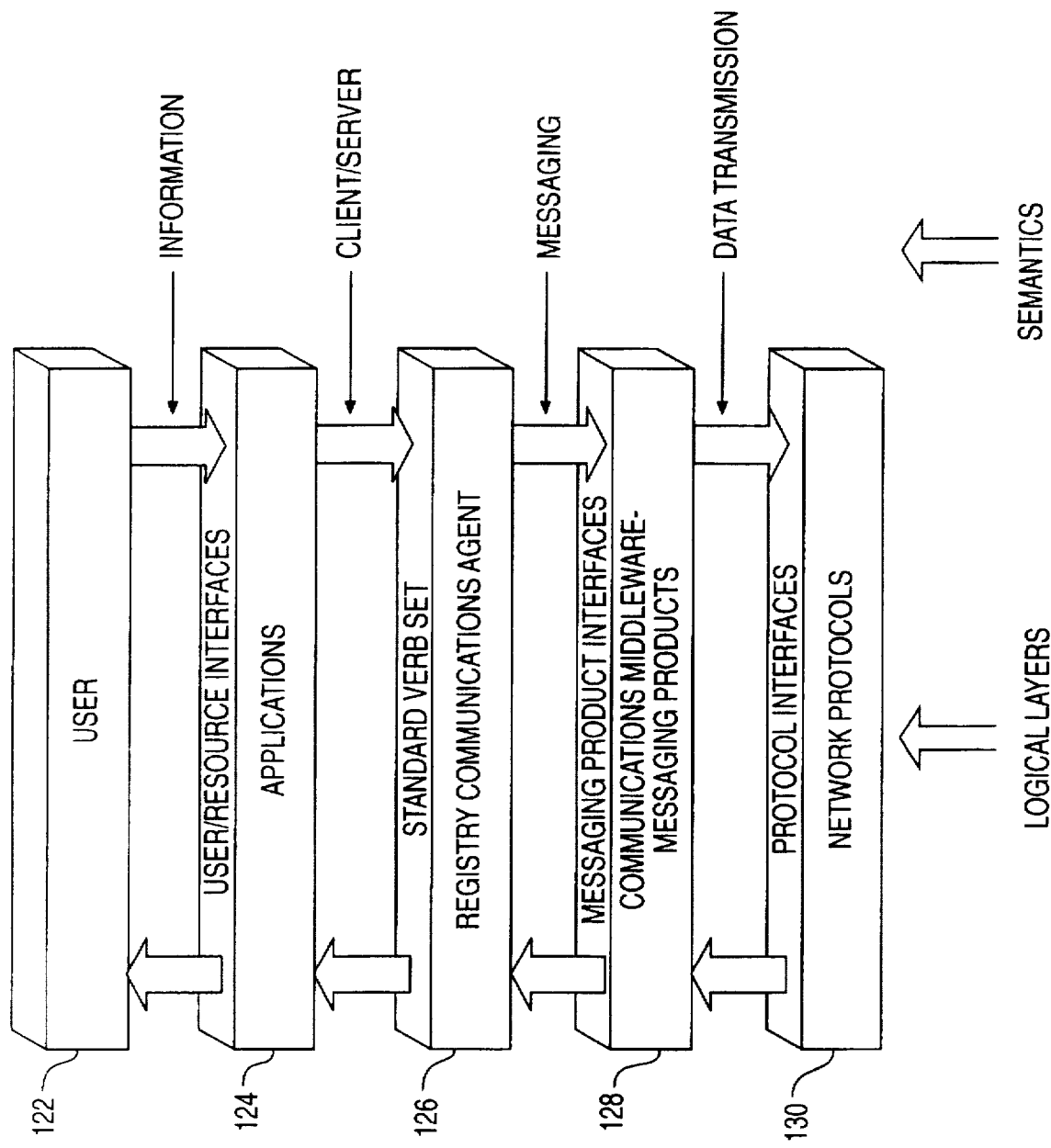

Referring to FIG. 1a, the role that Registry 104 assumes in logical layers of client/server communications is illustrated. In this diagram, the resource is identified on the front of each layer, the interface it provides is identified on the top of each layer, and the semantics used in the interface are identified to the right of each layer.

The top layer 122 represents the User of an application. It interfaces with an Application via Application-defined User/Resource Interfaces, exchanging business-oriented information with the Application.

The next layer down 124 represents the Application. It interfaces with Registry via use of a Standard Verb Set (SVS). The semantics used are business-oriented client/server transactions known as 'verbs', and represent the only protocol that the application programmers need to deal with.

The next layer down 126 represents Registry. It interfaces with Messaging Products (a.k.a., Communications Middleware) via Product-specific interfaces. The semantics used are specific to the Messaging Product.

The next layer down 128 represents the Communication Middleware Messaging Products. They interface with the Network via Network Protocol Interfaces, using data transmission semantics. The bottom layer 130, which represents Network Protocol, may consist of such types as SNA LU6.2 or TCP/IP.

In some cases, Registry 126 may actually span across the Communications Middleware layer 128. For example, Registry may translate client request messages into actual TCP/IP messages and send directly over the TCP/IP network.

Figure 2:
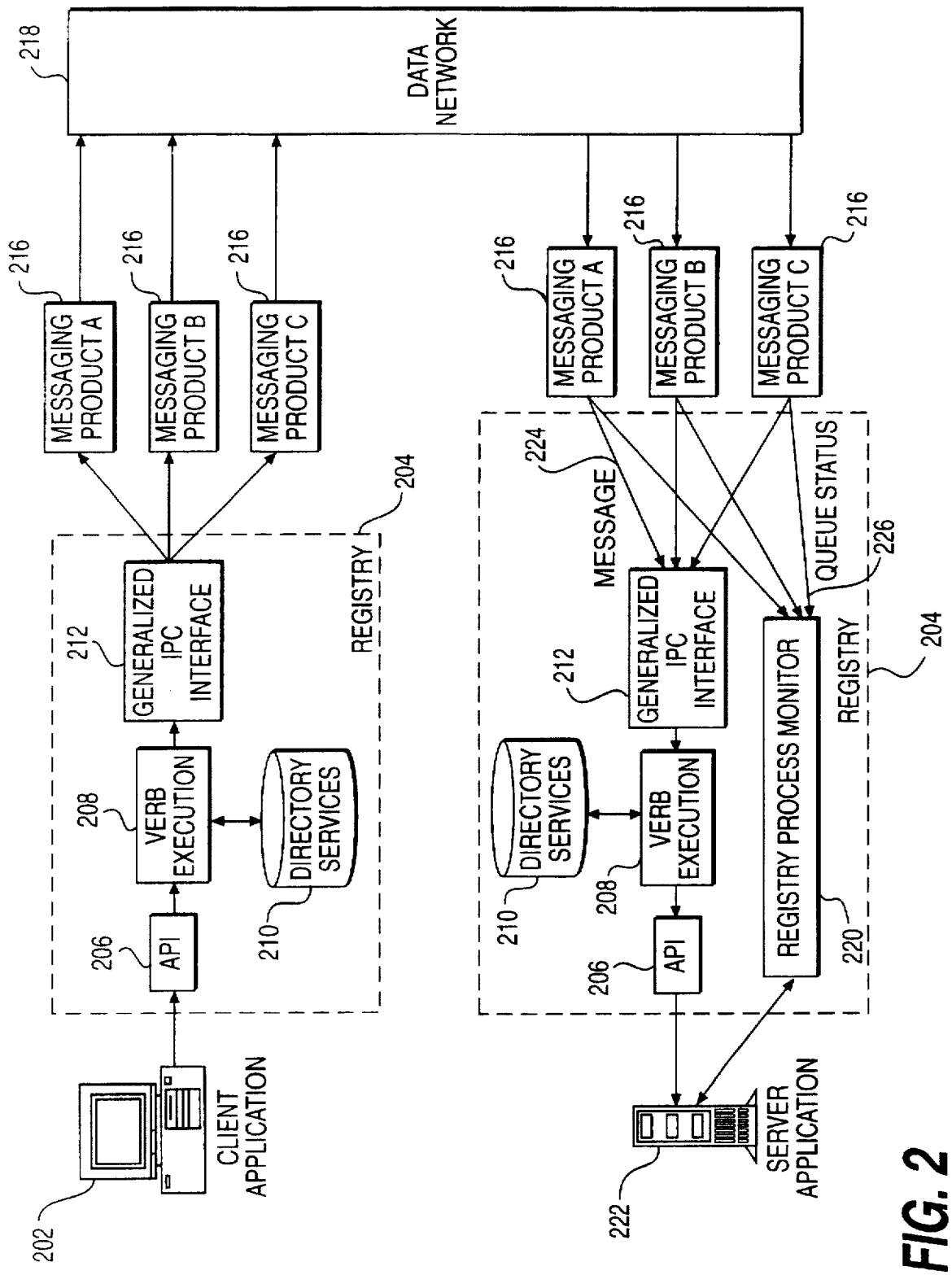
FIG. 2 is a block diagram illustrating the internal architecture of Registry, and a single thread of a distributed computing platform which utilizes it.

Referring to FIG. 2, the internal logical structure of Registry is shown to illustrate a typical client/server conversation utilizing Registry.

A Client Application 202 generates a request message that needs to be sent to a distant Server Application 222. A typical example of a request message may be a request for a customer's monthly billing revenue from a company's customer billing database located on a distant server. The Client and Server are connected by an enterprise Data Network 218, and have several Messaging Products 216 available to transport their messages over the Network 218. They will use Registry 204 as an interface to all of these Messaging Products 216 and Network 218 protocols.

The Client Application 202 communicates with Registry 204 via Registry's Application Programming Interface (API) 206. The API contains a set of commands known as a Standard Verb Set (SVS), which is defined as follows:

Standard Verb Set

Registry's Standard Verb Set (SVS) is a set of commands that Registry uses to communicate with both Client and Server applications. This limited set of commands represents all of the communications protocol that client/server application programmers will need to use for their applications to communicate with Registry and, thus, the enterprise network.

There are two sets of verbs: one for use by Client applications, and one for use by Server applications. Since an application can potentially function as either a Client or a Server, both sets of verbs are included in the SVS for every application. As noted previously, the SVS is maintained within the API 206 of Registry, as well as each Client and Server application.

The Client verbs and their parameters are defined as follows:

REGISTER—Establishes a session between the calling application and Registry. This session is only between the calling application and Registry, and not between applications. The session consists of a Registration Control Area (RCA), which is memory allocated by the REGISTER verb in Registry and passed back to the calling application. The RCA represents a unique instance of the registering process, and a new RCA is required for each issuance of REGISTER by the Client. Parameters of REGISTER are:

FEEDBACK—Field used to return to the calling application an indication as to whether Registry was able to complete the function called for.

REG-OPTIONS—This contains several fields, most of them optional, providing information used to identify the Client application. One required field of this parameter is a one-character designation indicating whether the calling application is a client or a server.

RCA-PTR—Field used to uniquely identify the RCA by serving as a pointer to the RCA. It designates a specific session established by REGISTER verb, and identifies subsequent calls to Registry as part of specific session. Each issuance of REGISTER must designate a different session and therefore have a different value for this field (for example, RCA-PTR1, RCA-PTR2, etc.).

DEREGISTER—Terminates activities of the client/server applications, and releases any associated Registry-managed resources. Parameters are the same as those for REGISTER.

SENDREQUEST—Used to send a client request to a server. Contains same parameters as REGISTER, plus the following:
WS-TEST-MSG—This field is the address of the actual message being sent by the Client to the Server.
WS-MSG-LEN—This field indicates the length of the Client message.

RECEIVEREPLY—Used to receive a reply to a previous request. The RCA must be the same one used for the SENDREQUEST verb. Contains same parameters as REGISTER, plus the following:
WS-OUT-MSG-PTR—This field is a pointer to the reply message.
WS-OUT-MSG-LEN—This field indicates the length of the reply message.

CONVERSE—Used to conduct a synchronous request/reply transaction. Contains same parameters as SENDREQUEST and RECEIVEREPLY combined.

The Server verbs and their parameters are defined as follows:

REGISTER—Same definition as Client version of verb. Server issues a REGISTER verb in response to Registry's request to do so.

DEREGISTER—Same definition as Client version of verb.

RECEIVEREQUEST—Used to receive a request message sent by a Client. The message itself will be received unmodified by Registry, and then processed by the Server. Contains same parameters as REGISTER, plus the following:
WS-REQUEST-MSG—This field is the address of the message being sent to the Server by the Client.
WS-REQUEST-LEN—This field indicates the length of the message.

SENDREPLY—Used to send the Server's reply to the Client's message. Contains same parameters as REGISTER, plus the following:
WS-SENDREPLY-MSG—This field is the address of the reply being sent to the Client by the Server.
WS-SENDREPLY-LEN—This field indicates the length of the reply.

With continued reference to FIG. 2, a Client Application 202 initiates a session by registering itself as a client with Registry 204. This is accomplished by issuing a REGISTER verb, which is read by the API 206. A Registry component identified as the Verb Execution 208 is responsible for validating the parameters and processing each verb. When a REGISTER verb is received by the API 206, Verb Execution 208 will create a Registration Control Area (RCA) and send the RCA address back to the Client 202 via the API 206. This RCA is used to store and process all communications between the Client and Registry.

The Client Application 202 will then issue a SENDREQUEST verb to Registry. This verb will command Registry to send the Client's request message, generated previously by the Client, to the Server 222. The actual request message will also be sent to Registry as a parameter of the SENDREQUEST verb. This message is in a format defined by the specific Client Application 202 that generated it, and will remain unmodified by Registry 204. Registry will simply deliver it to the Server 222.

Alternatively, the Client 202 may issue a CONVERSE verb, which establishes a two-way, conversational dialog with the Server 222. This is equivalent to issuing a SENDREQUEST and RECEIVEREPLY verb in combination. By issuing solely a SENDREQUEST verb, the Client 202 may establish either a conversational or a one-way dialog with the Server 222, depending on the verb's parameters.

With continued reference to FIG. 2, the SENDREQUEST verb is received and recognized by the API 206. Registry then initiates the Verb Execution 208 process.

The Verb Execution 208 will validate the parameters of the verb. It also resolves the destination address. It reads, from the Client Application's message, the name of the Server Application 222 for which the Client's request is intended. It then queries a Directory Services database 210 to determine the physical network destination for that Server Application 222. The Directory Services 210 contains physical network routing codes for each client/server application on the network. When a request or reply message is given to Registry to deliver to a specific application on the network, Registry determines where that application resides by translating its name to a physical network node via the Directory Services. In this way, when an application is migrated to another node on the network, only the Directory Services needs to be updated, as opposed to updating every client/server application.

In the preferred embodiment, the network destination of an application is represented by a three-part name, consisting of a Domain, a ServiceName, and a ServiceQualifier. The Domain refers to a distinct sub-network of the enterprise-wide network. The ServiceName refers to the function, rather than the physical location, of the destination node and is the fundamental identifier of the destination. The ServiceQualifier refers to a specific instance of the ServiceName function, in cases where there are more than one instance. An example would be specifying a ServiceName function of geographical customer data into ServiceQualifiers of "East" and "West".

With continued reference to FIG. 2, the Verb Execution 208 launches execution of the SENDREQUEST verb by issuing a Generalized IPC Request to a Generalized IPC Interface 212. IPC (Inter-Process Communications) refers to all components and processes between Registry at the Client end and Registry at the Server end. It includes Messaging Products 216, Data Networks 218, and anything that supports the communications between the Client processes and the Server processes.

The Generalized IPC Interface 212 is the Registry component responsible for selecting the appropriate IPC products for transporting the Client's message to the Server. The Generalized IPC Interface 212 contains a generalized view of all of the Messaging 216 and Network 218 products available, and selects one for use in the current session. It is also responsible for translating the message envelope (the message itself remains unmodified) to the appropriate format of the selected IPC product. The Generalized IPC Request is a command issued by Verb Execution 208 to the Generalized IPC Interface 212. It contains the Client's message, Server's network address, and a request to send the message.

Figure 2A:
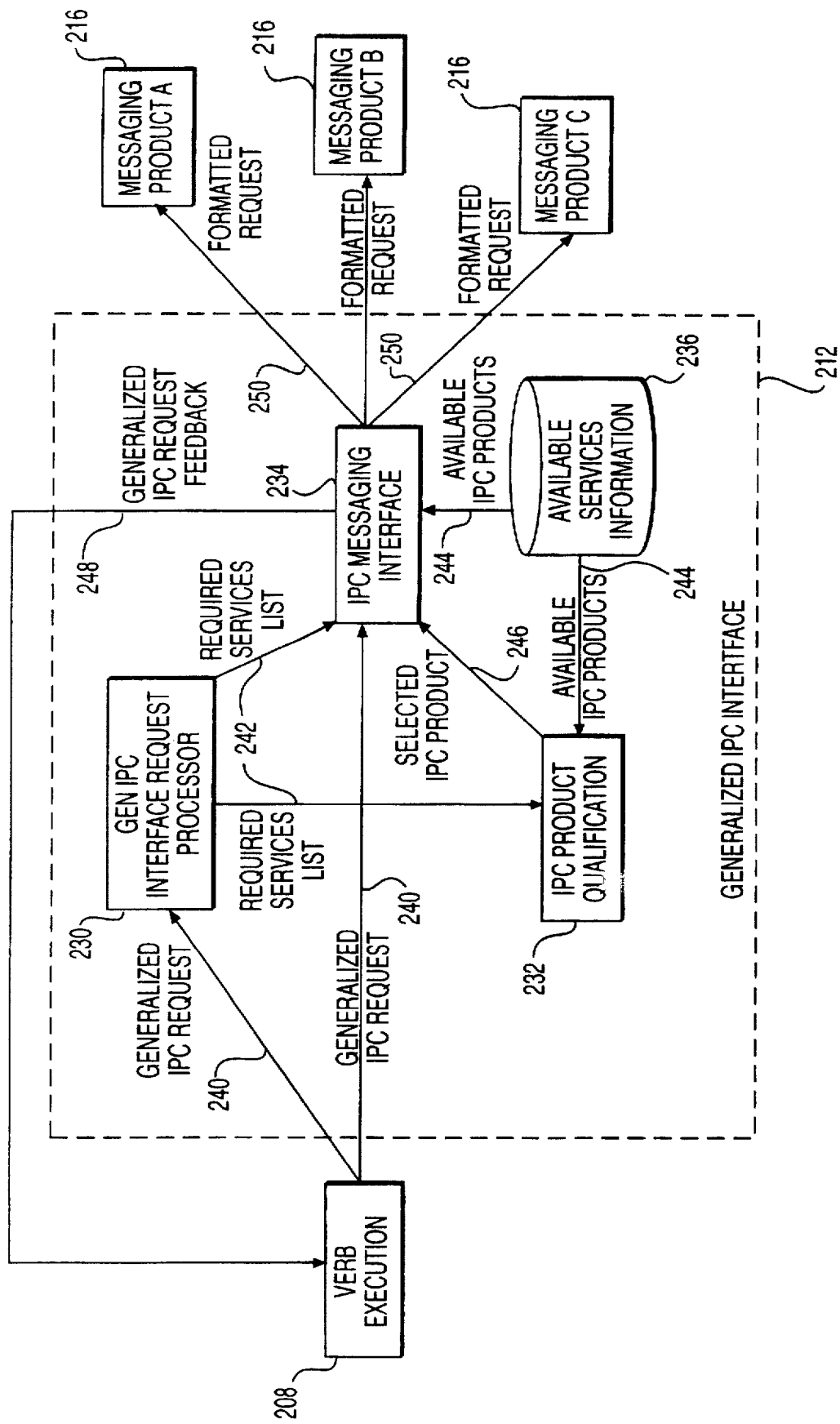
FIG. 2a is a dataflow diagram which illustrates in detail the Generalized IPC Interface identified in FIG. 2.

The Generalized IPC Interface 212 is shown in greater detail in FIG. 2a, which is a dataflow diagram illustrating the operation of the Interface 212. Referring to FIG. 2a, the Generalized IPC Interface is identified within the broken line. It consists of three primary logical components: a Generalized IPC Interface Request Processor 230, an IPC Product Qualification 232, and an IPC Messaging Interface 234. It also contains a database of Available Services Information 236, which may be a partitioned database of the Directory Services 210, or a separate database.

The Generalized IPC Interface Request Processor 230 provides the formal and initial interface to the Verb Execution 208. It receives the Generalized IPC Request 240 and determines what services are required to process the request. It then compiles these services into a Required Services List 242, which it forwards to the IPC Product Qualification 232. The Required Services List 242 is a set of data items, each item identifying a Registry-defined service that is needed to process the request. Examples of such services are persistent queuing, message recovery, and time-out.

The IPC Product Qualification component 232 determines which Messaging Product 216 is to be used for transporting the Client's message over the Data Network 218. This determination is based on two inputs: the Required Services List 242 from the Request Processor 230, and a list of Available IPC Products 244 from the Available Services Information database 236. The Available Services Information database 236, which resides with Directory Services 210 in the preferred embodiment of Registry, contains preprogrammed lists of all available IPC products (which includes Messaging Products 216 and Data Network 218 protocols) and their requirements. Based on the services required 242 for the particular request, and the Available IPC Products 244, the IPC Product Qualification component 232 selects the appropriate IPC Product 216 to use. It then sends the identification of this Selected IPC Product 246 to the IPC Messaging Interface 234.

The IPC Messaging Interface 234 provides Registry's interface to the selected IPC products, including the selected Messaging Product 216. As previously noted, IPC refers to all components needed to transport the message from the Client's Registry to the Server's Registry; this includes primarily industry-standard Messaging Products 216 and Data Network products 218. It translates the Generalized IPC Request 240 to a format defined and required by the selected Messaging Product 216. It also initiates the dialog with the Messaging Product 216. When the Generalized IPC Request 240 (which contains the Client's native request message) is translated to the proper Messaging Product 216 format, it is passed to the Messaging Product 216 for transport over the Data Network 218 to a distant Server 222.

Referring back to FIG. 2, at the Server end, the Messaging Product 216 receives the message from the Network 218, and delivers the message 224 to Registry 204 via the Generalized IPC Interface 212. This delivery of the message 224 to Registry 204, along with the entire process conducted by Registry at the Server end, is controlled by a Registry component identified as a Registry Process Monitor 220. The Registry Process Monitor 220 controls the Server's 222 receiving and processing of messages. It's objectives are to maximize Server throughput of messages, manage the desired number of Server tasks to process workloads, control server capacity and utilization by terminating/reactivating Server tasks as workload demands change, and to provide application-defined mechanisms for controlling server resource allocation.

Figure 2B:
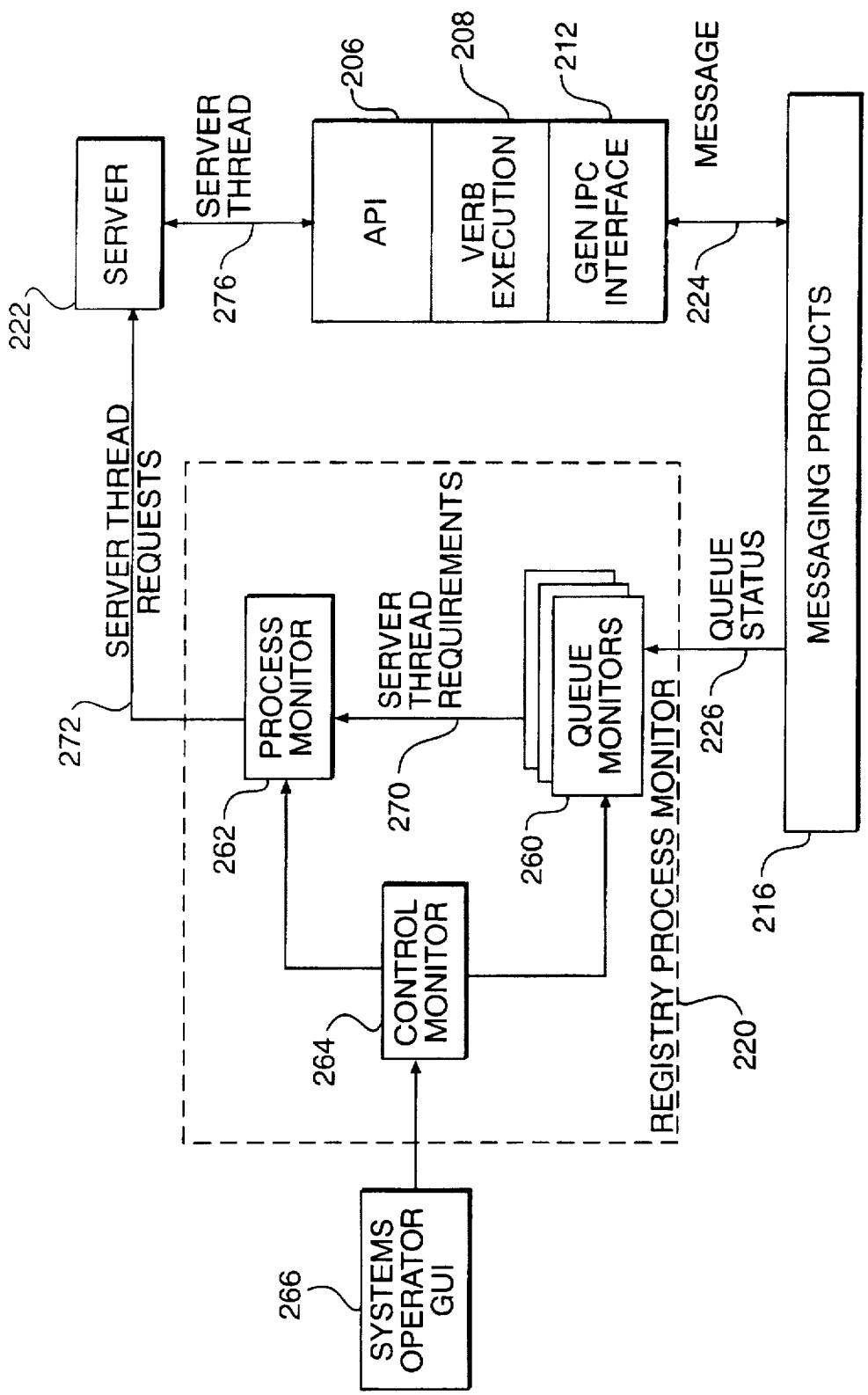
FIG. 2b is a block diagram showing the Registry Process Monitor in greater detail.

Referring to FIG. 2b, the Registry Process Monitor (RPM) 220 is shown in greater detail to illustrate its operation. The RPM consists of three primary components: a Queue Monitor (QM) 260, a Process Monitor (PM) 262, and a Control Monitor (CM) 264.

As Server-bound messages are retrieved from the Network 218 by the Messaging Products 216, they are held in queues pending retrieval by Registry 204. Each queue is assigned a class of service to indicate its priority. Each QM 260 is assigned to a queue or a range of queues, and therefore to a class of service or range of classes. The QM 260 monitors these queues by receiving queue status data 226 from the Messaging Products 216. By tracking which messages are released for Server processing, the QM 260 knows the Server's current level of utilization and its capacity for handling additional messages. When the QM 260 determines the Server has sufficient resource capacity for handling additional messages, the QM 260 selects a message from a specific queue for subsequent processing. It then sends to the PM 262 requirements 270 for a Server thread needed to retrieve the message. This Server thread 276 represents a processing link between the operating system of the Server 222 and Registry 204. It will be used by the Server Application 222 to request and receive the Client's message.

The PM 262 will send a request 272 to the Server 222 to setup a thread by registering itself with Registry. The Server 222 will then issue a REGISTER verb to Registry. This establishes a session between the Server 222 and Registry 204, identical to the manner in which the Client 202 has done. The Server 222 then issues a RECEIVEREQUEST verb, which allows it to receive the Client's request message via the Server Thread 276.

The RECEIVEREQUEST verb is received by the API 206 and passed to Verb Execution 208 for processing. Verb Execution 208 validates the parameters. From the WS-REQUEST-MSG parameter, Registry knows where the message is and can retrieve it via the Generalized IPC Interface 212. The IPC Interface 212 retrieves the message 224 and extracts the Client's native request message from it. This Client's request message is then passed to the Server 222 for application-specific processing.

The CM 264 serves a utility function, providing systems management and configuration for Registry. It provides a Graphical User Interface (GUI) 266 to a systems operator to allow an operator to perform system administration functions. It also allows the operator to modify the domain of queues managed by each QM 260.

Referring back to FIG. 2, after processing the Client's request message, and if a reply is required, the Server 222 issues a SENDREPLY verb. This verb contains the Server's reply message as a parameter, which is identified as WS-SENDREPLY-MSG. This verb is processed similar to how the SENDREQUEST verb was processed previously.

Figure 3A:
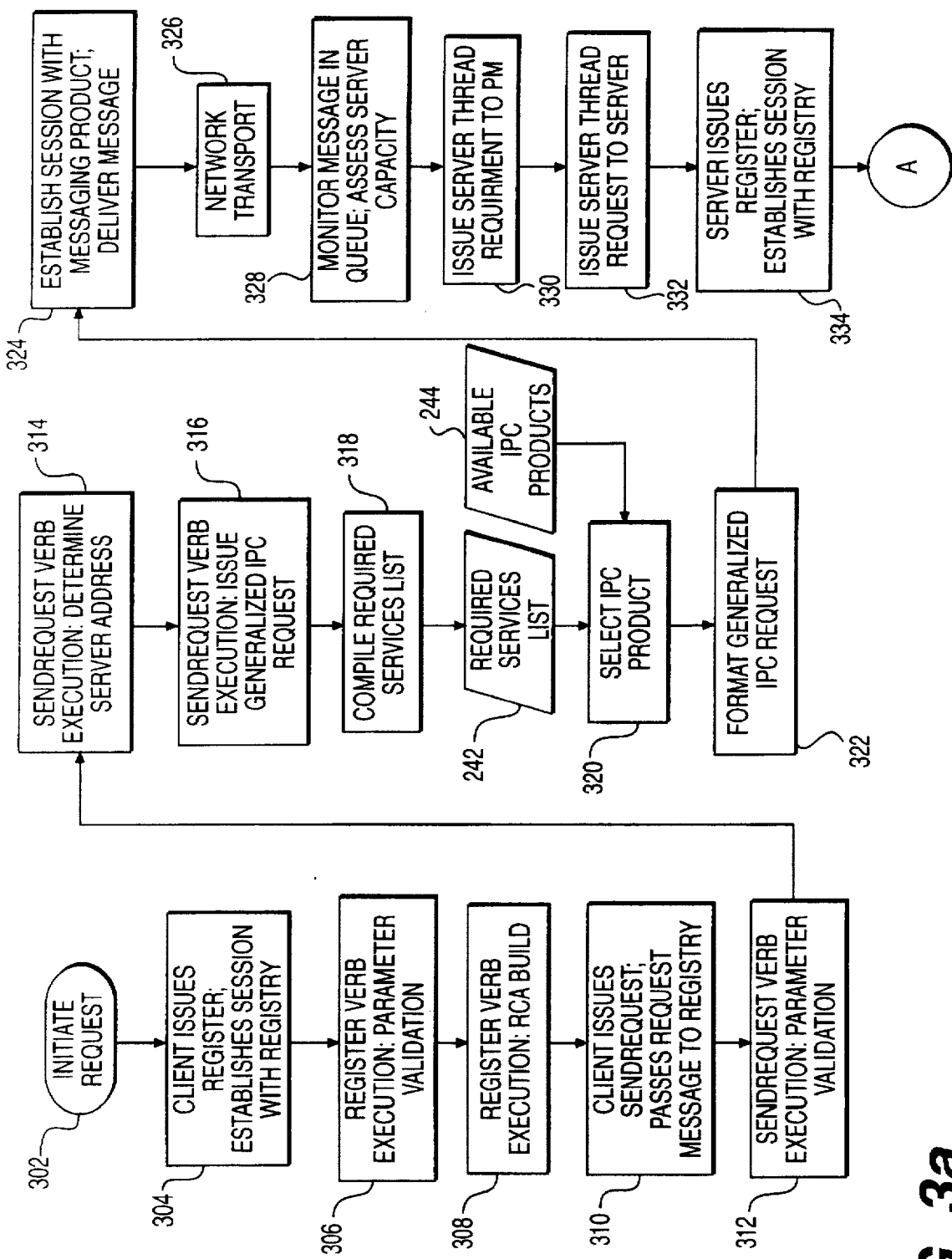
FIG. 3a is a process flowchart illustrating the operation of Registry.

Referring to FIG. 3a, a process flowchart illustrates the operation of Registry when a Client Application issues a SENDREQUEST verb to send a message to a Server Application. A similar operation would be conducted if a CONVERSE verb was issued.

In step 302, the Client Application 202 initiates a request for a Server Application 222 to process. This request must be delivered to the Server Application 222, which resides on a distant machine. In step 302, the request is thus far contained within the Client Application 202.

In step 304, the Client 202 issues a REGISTER verb to Registry 204. The REGISTER verb is the command that establishes a communications session between the Client 202 and Registry 204. In step 306, the Verb Execution component 208 of Registry 204 validates the parameters of the REGISTER verb. Then in step 308, Verb Execution 208 builds a Registration Control Area (RCA), which is a memory allocation used for passing verb parameters (including the Client's message) between the Client 202 and Registry 204.

In step 310, the Client 202 issues a SENDREQUEST verb to Registry 204. The Client 202 sends its request message as a parameter of the SENDREQUEST verb. In step 312, the Verb Execution component 208 of Registry 204 validates the parameters of the SENDREQUEST verb. Then in step 314, Verb Execution 208 determines the physical network routing address of the intended Server Application 222. This is done by extracting the Server Application name from the Client's message and translating that name to a network destination via a query to the Directory Services 210. The Directory Services 210 will return a network destination in the form of a Domain, a ServiceName, and a ServiceQualifier, as specified previously in reference to FIG. 2.

In step 316, the Verb Execution component 208 performs its final function on the SENDREQUEST verb by issuing a Generalized IPC Request to the Generalized IPC Interface 212. The Generalized IPC Request is a command that instructs the IPC Interface 212 to perform certain functions needed to deliver the Client's message. These functions are specified in steps 318 through 324. The Generalized IPC Request also contains the Client's message and the Server's network address. The issuance of the Generalized IPC Request is depicted in FIG. 2a as item 240.

With continued reference to FIG. 3a, in step 318, the Generalized IPC Interface Request Processor 230 compiles a list of services that are required to process the Generalized IPC Request. These required services will be performed by the Messaging Product 216. The Required Services List 242 that is generated is used by the IPC Product Qualification component 232 in step 320 to select an IPC product. The IPC Product Qualification 232 also receives a list of Available IPC Products 244 from the Available Services Information database 236.

In step 320, the IPC Product Qualification 232 matches the required services from the Required Services List 242 to those offered from certain IPC products identified in the Available IPC Products list 244, and selects the appropriate IPC product. The selected IPC product will be a Messaging Product 216 and/or a Data Network 218 transport protocol. Identification of the selected IPC product is then sent to the IPC Messaging Interface component 234.

In step 322, the IPC Messaging Interface component 234 formats the Generalized IPC Request (which it has received from Verb Execution 208 as depicted in FIG. 2a) into a message that is proprietary to the selected IPC product. The procedures for this translation of formats have been programmed into the IPC Messaging Interface component 234. Then, in step 324, the Interface 234 establishes a communications session with the selected Messaging Product 216 in a manner that is standard for that Messaging Product. Once the session is established, the message is passed to the Messaging Product, which proceeds to deliver the message over the Data Network 218. Note, the "message" referred to here consists of the Client's native request message packaged in an envelope that Registry has formatted specifically for the selected IPC Products.

Step 326 represents the transport of the message over the Data Network 218 in a manner that is standard for the particular network protocol that is in use.

In step 328, Registry at the Server site is prepared to receive the message. The Queue Monitor (QM) component 260 of the Registry Process Monitor 220 monitors the message in a certain queue. It does this by receiving queue status data 226 from each of the connected Messaging Products 216. The QM 260 also tracks Server resource capacity by being programmed with initial Server capacity and tracking each message that is sent to the Server. In this way, the QM 260 knows the current Server utilization and its capacity for processing additional messages. As part of step 328, the QM 260 assesses the current capacity of the Server and determines when the next message may be retrieved.

In step 330, the QM 260 determines that the next message is to be retrieved and issues requirements for a Server thread 276. As mentioned previously, this Server thread 276 represents a processing link between the operating system of the Server 222 and Registry 204. It will be used by the Server Application 222 to request and receive the message. The Server thread requirements are issued by the QM 260 to the Process Monitor (PM) 262.

In step 332, the PM 262 issues a request for a Server thread to the operating system of the Server. This serves as a trigger for the Server Application 222 to establish a session with Registry 204. This is done by issuing a REGISTER verb, as was done previously by the Client 202.

In step 334, the Server 222 issues the REGISTER verb, which is read by Registry's API 206 and passed to Verb Execution 208. This establishes the Server's session with Registry. The process continues at the off-page connector A in FIG. 3b.

Figure 3B:
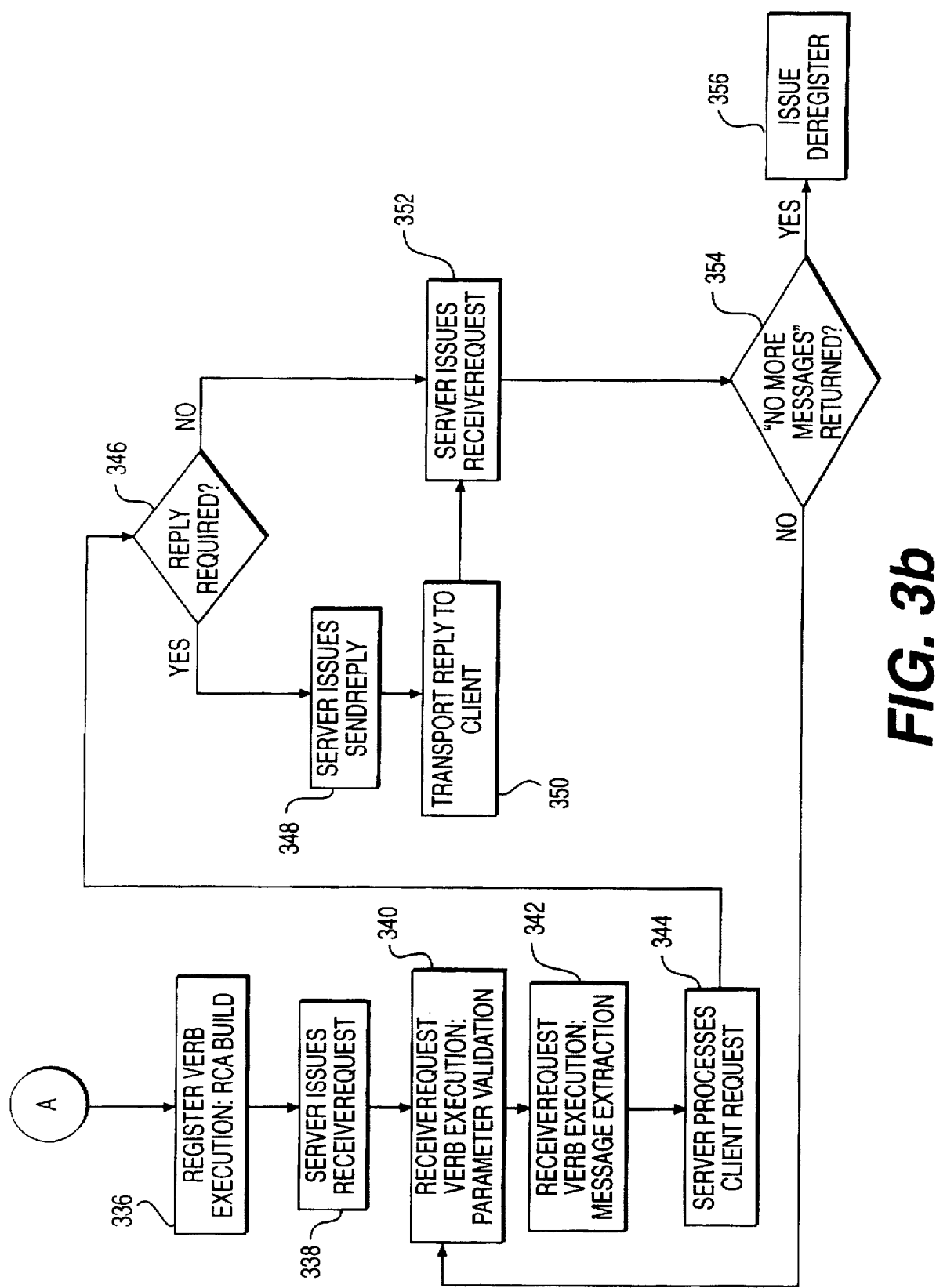

Referring now to FIG. 3b, in step 336, Verb Execution 208 processes the Server's REGISTER verb as it did with the Client's. It builds the RCA that is specific to the current session. Then, in step 338, the Server 222 issues a RECEIVEREQUEST verb to Registry. The RECEIVEREQUEST verb instructs Registry to send the Client's message to the Server 222.

In step 340, Verb Execution 208 validates the parameters of the RECEIVEREQUEST verb. One of these parameters will be populated with the address in memory of the Client's request message. In step 342, Verb Execution 208 extracts the Client's native request message from the packaged message that was delivered over the Network 218, and passes this request message to the Server 222.

In step 344, the Server 222 processes the Client's request message in a manner that is specific to the application and independent of Registry. A Server reply to the Client request may or may not be required, as determined in step 346. If a reply is required, the Server 222 issues a SENDREPLY verb in step 348, which is processed in the same manner as a Client's SENDREQUEST verb, beginning in step 310. The Server's reply is then delivered to the Client, as indicated in step 350. The Server 222 then proceeds to issue another RECEIVEREQUEST verb in step 352.

If a reply is not required, as determined in step 346, the Server 222 issues another RECEIVEREQUEST verb in step 352. If no more request messages are in queue for the Server, a message stating "No More Messages" is returned to the Server 222 from Registry 204, as indicated in step 354. Then the process ends with step 356, in which the Server 222 issues a DEREGISTER verb. The DEREGISTER verb instructs Registry to end the session.

If, in step 354, the "No More Messages" message is not returned, an assumption is made that more request messages are in queue. The process returns to step 340, in which the Verb Execution 208 proceeds to process the RECEIVEREQUEST verb by validating the parameters.

The specifications in the above description should not be construed as limitations on the scope of the invention, but rather as specifications of the preferred embodiment. Other obvious variations and modifications are possible, and will occur to persons skilled in the art.

It should be understood that the invention is not limited to the exact details of construction shown and described herein for obvious modifications will occur to persons skilled in the art.

We claim:

1. A client-server computer system serving as a logical layer of communications between applications and transport mechanisms of a data network, and comprising:
   a plurality of clients, each capable of initiating applications controlled by a corresponding operating system;
   a first registry connected to each client for
      (a) accepting application specific messages from a client, destined for a preselected server, and encapsulating them into a standard registry specific message; and
      (b) translating the registry specific messages into one of a plurality of preselected protocols;
   a network for communicating the translated messages to a distant end;
   a plurality of diverse first messaging devices connected between the first registry and the network, for communicating, to the network, the registry specific messages in the preselected protocol of a selected first messaging device, the first messaging device being selected by the first registry;
   a second registry located at the distant end for
      (c) accepting the translated messages; and
      (d) converting the messages from protocol format to the original application specific message; and wherein the second registry is connected to the preselected server for communicating the application specific message to the server;
   a plurality of diverse second messaging devices, connected between the network and the second registry input for receiving registry specific messages in the preselected protocol and transferring them to the second registry.

2. The system set forth in claim 1 wherein the first registry further comprises:
   an application programming interface, connected to an output of the client, for receiving a verb command from the client and translating a related application specific message from the client to a corresponding registry format;
   a validating device for validating parameters of the verb command and subsequently resolving a destination address for the message from the client;
   a directory services database queried by the validated verb command for determining a logical network destination to the server for which the client's message is intended;
   an inter-process communicator for switching the message in registry format to one of a plurality of adapters connected in parallel to the output of the inter-process communicator, in response to destination information derived from the directory services database, the adapter mapping the registry message into a specific protocol format required by a selected first messaging device and destined for a server.

3. The system set forth in claim 1 wherein the second registry comprises:
   a plurality of parallel connected adapters connected to the outputs of the second messaging device for translating the messages in the specific protocol to registry format;
   inter-process communication for selectively receiving translated messages from the adapters for further processing; and
   an application programming interface, connected to an output of the inter-process communication for translating a message, in registry format, to a format required by a server application and connecting it to a designated server; and
   a registry monitor connected to an input of the application programming interface, for scheduling processing by a designated server;
   a second validator for validating parameters of the a verb command generated by the server, in response to an inquiry from the and subsequently resolving a destination address for the message from the client;
   a directory services database queried by the verb validating command from the client, for determining a logical network destination for a response, from the server to a client that generated an initial inquiry;
   the inter-process communication in the second registry selecting an adapter in the second registry for communicating the response to an input of a selected second messaging device; and
   an adapter, located outside the second registry, for connecting the messaging device to the network.

4. In a computer system having a plurality of client and server machines selectively interconnected over a network, each capable of executing applications controlled by a different operating system, a logical layer of communications between the machines and comprising the steps:
   performing a first registry process including
      (a) accepting application specific messages from a client, destined for a preselected server, and encapsulating them into a standard registry specific message; and
      (b) translating the registry specific messages into one of a plurality of preselected protocols;
   subjecting the registry specific message to a plurality of diverse messaging routes for communicating, to the network, the registry specific messages in the preselected protocol of a selected messaging route, the selected messaging route being selected by the first registry process;
   performing a second registry process at a distant end including
      (c) accepting the translated messages; and
      (d) converting the messages from protocol format to the original application specific format;
   connecting the converted application specific message to the preselected server.

5. The method set forth in claim 4 wherein the first registry process further comprises the steps:
   application programming interfacing with the client, for receiving a verb command from the client and translating a related application specific message from the client to a corresponding registry format;
   validating parameters of the verb command and subsequently resolving a destination address for the message from the client;
   querying a directory services database by the validated verb command for determining a logical network destination to the server for which the client's message is intended;
   inter-process communication switching of the message, in registry format, to one of a plurality of adapters in response to destination information derived from the directory services database, the adapter mapping the registry message into a specific protocol format required by a selected first messaging device and destined for a server.

6. The method set forth in claim 4 wherein the second registry process comprises the steps:

subjecting messages in the specific protocol to reversed adaptation thereby translating the messages into registry format;

inter-process communication switching for selectively receiving translated adapted messages for further processing;

application programming interfacing for translating a message, in registry format, to a format required by a server application and connecting it to a designated server; and monitoring the application programming interfacing, for scheduling processing by a designated server;

validating parameters of the a verb command generated by the server, in response to an inquiry from the client and subsequently resolving a destination address for the message from the client;

querying a directory services database by the verb validating command from the client, for determining a logical network destination for a response, from the server to the client that generated an initial inquiry;

communicating the response in the direction of the client for final delivery to the client that initiated the application.

* * * * *